(12) United States Patent
Bae

(10) Patent No.: US 8,941,640 B2
(45) Date of Patent: Jan. 27, 2015

(54) DIFFERENTIAL VCOM RESISTANCE OR CAPACITANCE TUNING FOR IMPROVED IMAGE QUALITY

(75) Inventor: Hopil Bae, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 13/601,677

(22) Filed: Aug. 31, 2012

(65) Prior Publication Data

US 2013/0328952 A1 Dec. 12, 2013

Related U.S. Application Data

(60) Provisional application No. 61/657,671, filed on Jun. 8, 2012.

(51) Int. Cl.
*G06F 3/038* (2013.01)

(52) U.S. Cl.
USPC .......................................... 345/214; 345/100

(58) Field of Classification Search
USPC ............ 345/87, 92, 100, 173, 212, 214, 698; 349/143
See application file for complete search history.

(56) References Cited

U.S. PATENT DOCUMENTS

| | | | |
|---|---|---|---|
| 6,222,596 B1 | 4/2001 | Veerasamy | |
| 6,243,062 B1 | 6/2001 | den Boer et al. | |
| 8,589,100 B2 * | 11/2013 | Chaji et al. | 702/64 |
| 2003/0085856 A1 * | 5/2003 | Klein et al. | 345/87 |
| 2006/0267914 A1 | 11/2006 | Chang et al. | |
| 2007/0290957 A1 * | 12/2007 | Cok | 345/77 |
| 2008/0062139 A1 | 3/2008 | Hotelling et al. | |
| 2008/0266217 A1 | 10/2008 | Kim | |
| 2010/0194695 A1 * | 8/2010 | Hotelling et al. | 345/173 |
| 2010/0194696 A1 * | 8/2010 | Chang et al. | 345/173 |
| 2010/0245326 A1 | 9/2010 | Xiao | |
| 2010/0289838 A1 * | 11/2010 | Markvoort et al. | 345/691 |
| 2011/0025635 A1 * | 2/2011 | Lee | 345/173 |
| 2011/0221726 A1 * | 9/2011 | Huitema | 345/209 |
| 2011/0248949 A1 * | 10/2011 | Chang et al. | 345/174 |
| 2012/0092319 A1 * | 4/2012 | van Veenendaal et al. | 345/211 |
| 2012/0099069 A1 | 4/2012 | Yoshiga | |
| 2012/0313881 A1 * | 12/2012 | Ge et al. | 345/174 |
| 2013/0076721 A1 * | 3/2013 | Al-Dahle | 345/212 |
| 2013/0082994 A1 * | 4/2013 | Al-Dahle | 345/208 |
| 2013/0141343 A1 * | 6/2013 | Yu et al. | 345/173 |
| 2013/0141348 A1 * | 6/2013 | Jamshidi-Roudbari et al. | 345/173 |
| 2013/0328755 A1 * | 12/2013 | Al-Dahle et al. | 345/87 |
| 2013/0328759 A1 * | 12/2013 | Al-Dahle et al. | 345/89 |
| 2013/0328795 A1 * | 12/2013 | Yao et al. | 345/173 |

FOREIGN PATENT DOCUMENTS

| | | |
|---|---|---|
| EP | 1026657 A2 | 8/2000 |
| WO | 2007034353 A2 | 3/2007 |

OTHER PUBLICATIONS

International Search Report and Written Opinion for PCT No. PCT/US2013/044737 dated Sep. 11, 2013; 12 pgs.

* cited by examiner

*Primary Examiner* — Joe H Cheng
(74) *Attorney, Agent, or Firm* — Fletcher Yoder PC

(57) ABSTRACT

Devices and methods for reducing a variation in voltage perturbation between common voltage layers (VCOMs) of a display in response to voltage interference are provided. In one example, a resistive element may be coupled to one of several VCOMs to increase the resistance value of the VCOM. The resistive element may cause a variation in voltage perturbations between the several VCOMs to become generally more uniform, thereby reducing or eliminating certain image artifacts.

26 Claims, 8 Drawing Sheets

DIFFERENTIAL VCOM RESISTANCE OR CAPACITANCE TUNING FOR IMPROVED IMAGE QUALITY

CROSS REFERENCE TO RELATED APPLICATIONS

This application is a Non-Provisional Patent Application of U.S. Provisional Patent Application No. 61/657,671, entitled "Differential VCOM Resistance or Capacitance Tuning for Improved Image Quality", filed Jun. 8, 2012, which are herein incorporated by reference.

BACKGROUND

The present disclosure relates generally to electronic displays and, more particularly, to liquid crystal displays (LCDs) having common voltage layers (VCOMs) with differential additional resistances and/or capacitances to improve image quality of the LCD.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), are commonly used in electronic devices such as televisions, computers, and phones. LCDs portray images by modulating the amount of light that passes through a liquid crystal layer within pixels of varying color. For example, by varying a voltage difference between a pixel electrode and a common electrode in a pixel, an electric field may result. The electric field may cause the liquid crystal layer to vary its alignment, which may ultimately result in more or less light being emitted through the pixel where it may be seen. By changing the voltage difference (often referred to as a data signal) supplied to each pixel, images may be produced on the LCD.

To store data representing a particular amount of light that is to be passed through pixels, gates of thin-film transistors (TFTs) in the pixels may be activated while the data signal is supplied to the pixels. When the TFT gates are deactivated, a voltage perturbation may occur on certain components of the LCD. For instance, a VCOM of the display may be perturbed when the TFT gates are deactivated. When the LCD may includes segmented components (e.g., a segmented VCOM), undesirable artifacts corresponding to the segments may occur when the TFT gates are deactivated.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing a variation in voltage perturbation between common voltage layers (VCOMs) of a display—thereby reducing variations in data signal voltages stored in pixels—to improve image quality of the display. By way of example, a system and/or method for reducing a variation in voltage perturbation between VCOMs of a display may involve increasing the resistance or capacitance of a column of common electrodes such that the column of common electrodes responds similarly to a row of common electrodes. The system and/or method may further include a tunable resistance whose value may be adjusted to achieve an effective value for reducing a variation in voltage perturbation between the VCOMs. The system and/or method may also include controlling removal of the resistance when the LCD display is in a touch mode.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
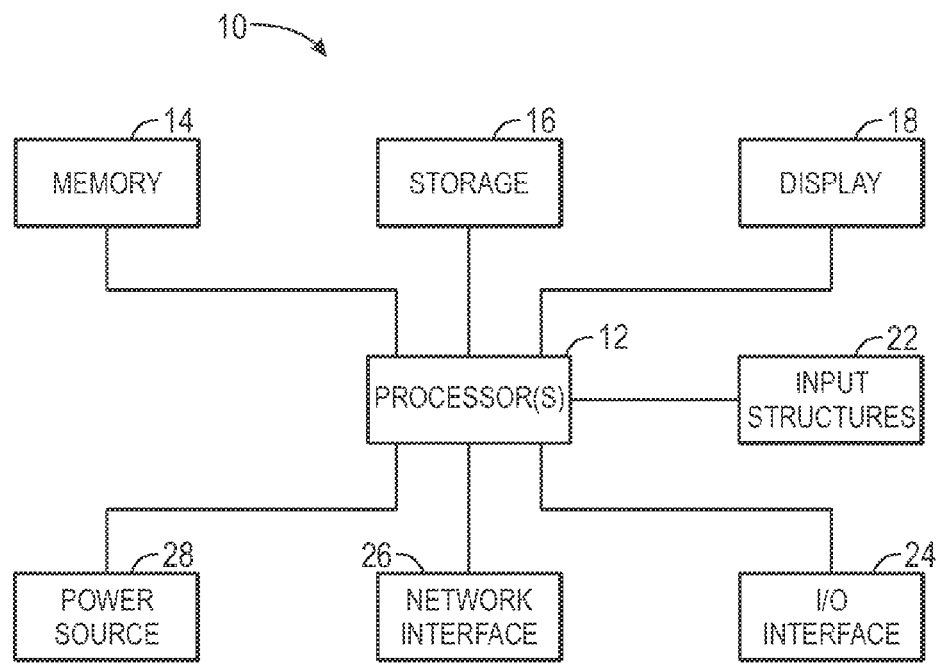
FIG. 1 is a schematic block diagram of an electronic device with a liquid crystal display (LCD) that can reduce variations in voltage perturbation between common voltage layers (VCOMs) to reduce or avoid resulting image artifacts, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to liquid crystal displays (LCDs) and electronic devices incorporating LCDs. The present disclosure provides a device, method, or combination thereof for controlling the response of a common voltage layer (VCOM) to voltage disturbance caused by TFT gate deactivation. Specifically, the device, method, or combination thereof may decrease a variation in voltage perturbation between two or more different common voltage layers (VCOMs) of the LCD caused by TFT gate deactivation. By causing the voltage perturbation of the various VCOMs of the LCD to occur in a uniform manner, the image quality of the LCD may improve.

As mentioned above, pixels of an LCD may be programmed by providing data signals to the pixels while asserting an activation signal. In general, when the activation signal is removed, the pixels become deactivated and the provided data signals may be programmed in the pixels. At the same time, however, the removal of the activation signal may cause voltage perturbations on the VCOMs of the LCD. These voltage perturbations could affect the data that is ultimately programmed into the pixels. Indeed, non-uniform voltage perturbations on different VCOMs could therefore produce undesirable image artifacts. For example, pixels associated with one VCOM may generally produce different colors than pixels associated with another VCOM.

This disclosure will describe various ways to reduce such image artifacts by preventing uneven voltage perturbations on the VCOMs of an LCD. Indeed, in one example, the LCD may include a set of row pixels coupled in series to a row common voltage layer (row VCOM) which extends across a portion of the LCD, as well as a set of column pixels individually coupled to a column common voltage layer (column VCOM) which may extend down a portion of the LCD, perpendicular to the row pixels. Due to their orientation, structure, and relation to a TFT gate line, the row VCOM and the column VCOM voltages may be affected differently by the TFT gate deactivation. Generally, the TFT gate line may extend across a portion of the display, substantially overlapping with the row pixels and the row VCOM. The TFT gate line may also intersect the column pixels, overlapping just a portion of the column VCOM. As such, the row VCOM may experience more interference from voltage changes in the gate line than the column VCOM. Specific effects of TFT gate deactivation will be further discussed in FIGS. 7-8. It should be noted that in certain embodiments, the column common voltage layer may extend across a portion of the LCD, and the row common voltage layer may extend down a portion of the LCD, depending on the orientation of the LCD.

To reduce the voltage perturbation difference between the row VCOM and the column VCOM of the LCD, a resistance may be added to the column VCOM. The added resistance may alter the way in which the column VCOM responds to the voltage perturbation caused by TFT gate deactivation to be similar to the way the row VCOM responds. Further, the added resistance may include an adjustable resistance value which may be tuned until image quality is improved. In certain embodiments, the resistance may also be removed or switched off when the LCD is in a touch sensor mode rather than display mode.

Figure 2:
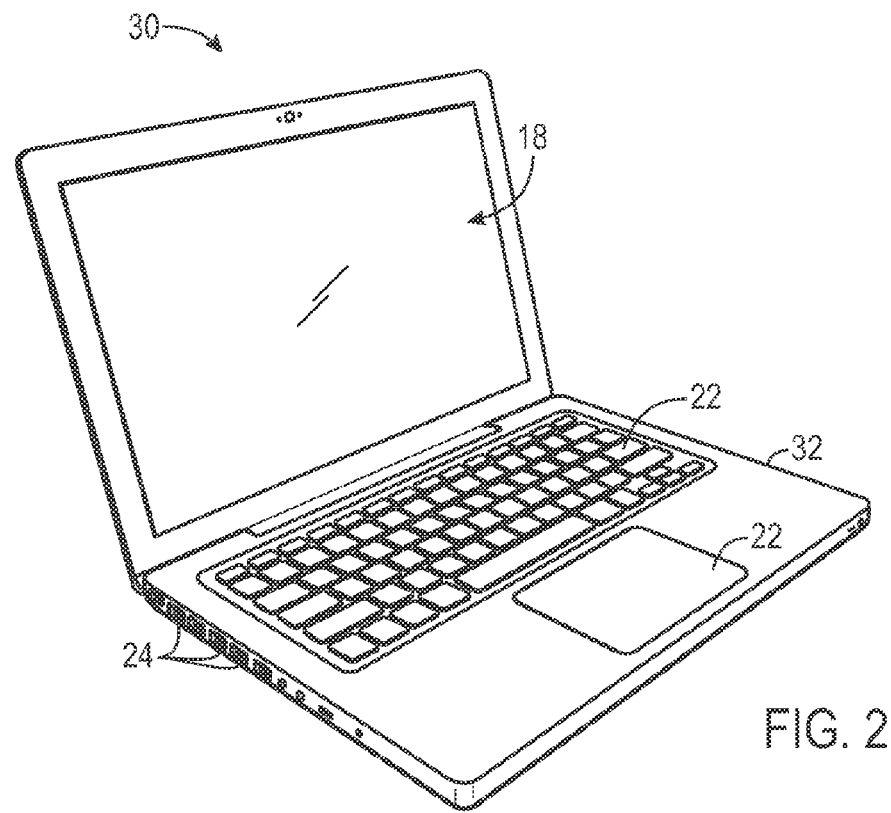
FIG. 2 is a perspective view of a notebook computer representing an embodiment of the electronic device of FIG. 1.
Figure 3:
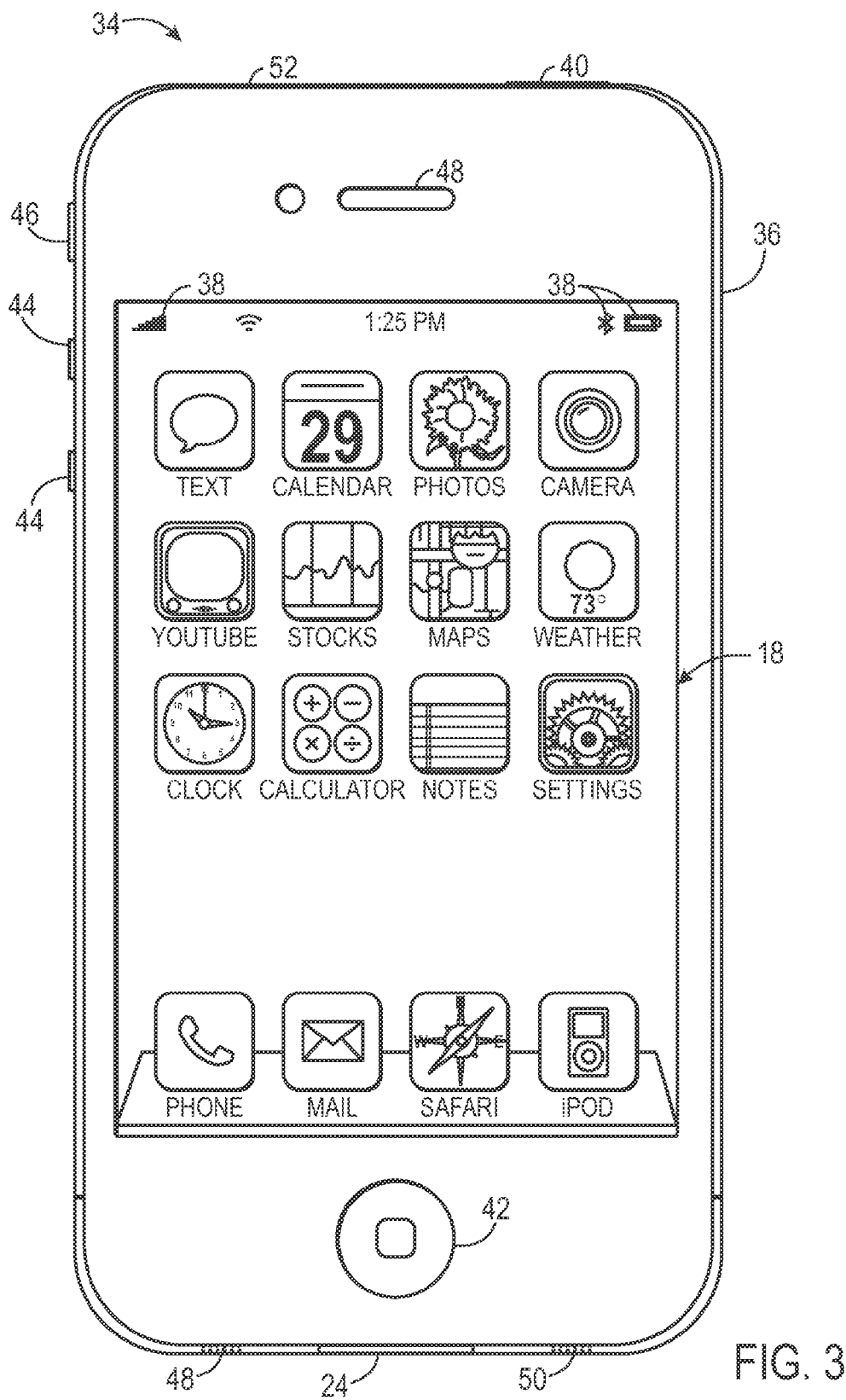
FIG. 3 is a front view of a handheld device representing another embodiment of the electronic device of FIG. 1.

With the foregoing in mind, a general description of suitable electronic devices that may employ electronic displays having capabilities to reduce variation in voltage perturbation between VCOMs is described below. In particular, FIG. 1 is a block diagram depicting various components that may be present in an electronic device suitable for use with such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, when there is a variation in voltage perturbation between VCOMs of the display 18, image quality of the display 18 may be distorted. For example, portions of the display 18 using one VCOM could produce different colors than portions of the display 18 using a different VCOM unless made more uniform, as taught by this disclosure.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." This data processing circuitry may be embodied wholly or in part as software, firmware, hardware, or any combination thereof Furthermore, the data processing circuitry may be a single contained processing module or may be incorporated wholly or partially within any of the other elements within the electronic device 10. As presented herein, the data processing circuitry may control the application of the added resistance as well as tuning of the resistance level to reduce a variation in voltage perturbation between two VCOMs (e.g., a column VCOM and a row VCOM) of the display 18.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. As will be described further below, the display 18 may include at least to distinct common voltage layers (VCOMs). An additional resistance may be added to at least one of these VCOMs to cause that VCOM to respond to voltage perturbations in a similar way as other VCOMs. By reducing variations in voltage perturbations on the VCOMs, color reproduction on the display 18 may be more uniform. As provided in an example discussed below, the electronic device 10 may include circuitry to control the resistance(s) of at least one of the VCOMs of the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 18. The display may include a plurality of the column common electrodes and a plurality of the row common electrodes, in which the column common electrodes include the additional resistance tuning for reducing a variation in voltage perturbation between VCOMs of the display 18.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may include row common electrodes and column common electrodes, in which the column common electrodes have an increased resistance for reducing a variation in voltage perturbation between the column VCOM and the row VCOM.

Figure 4:
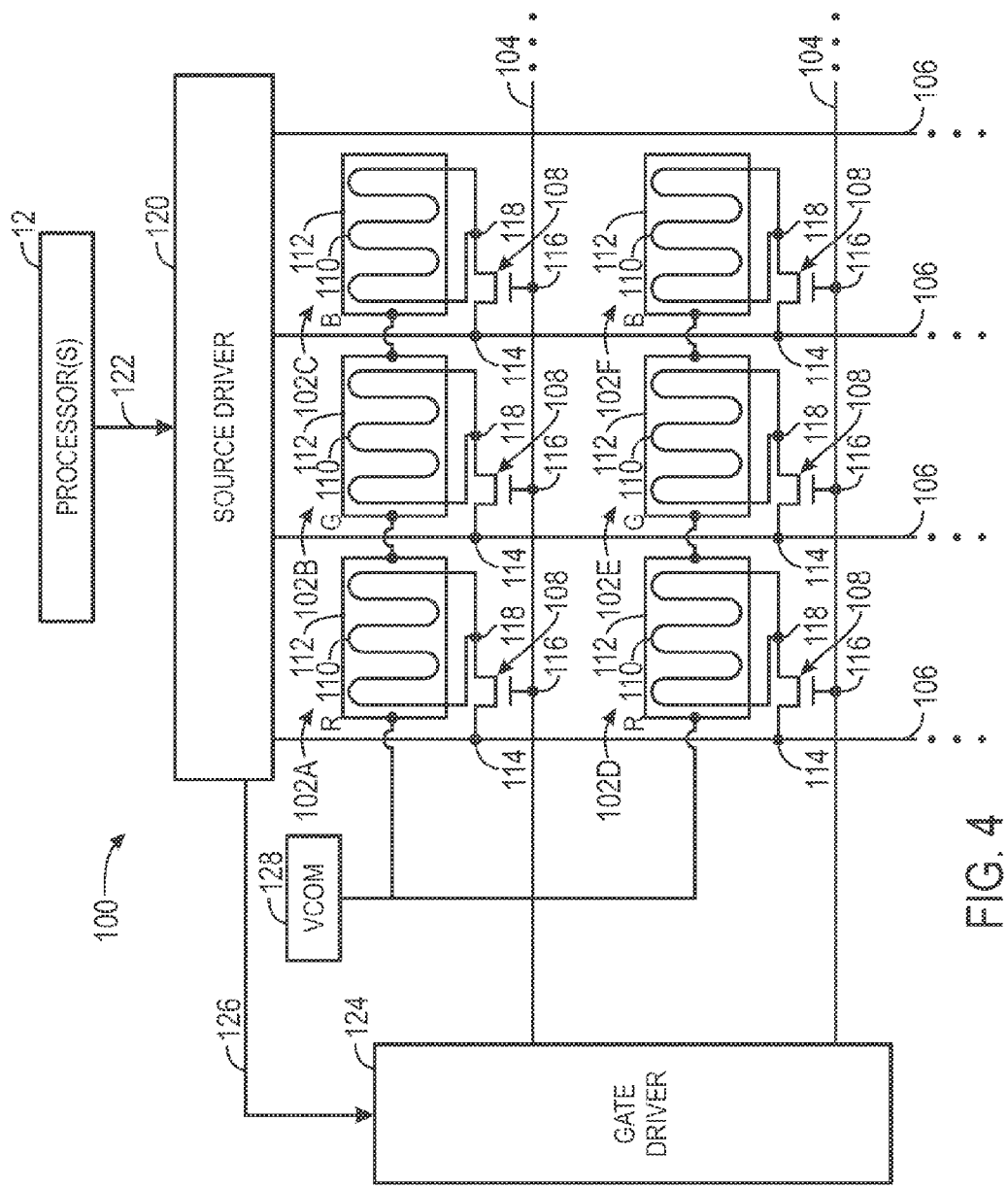
FIG. 4 is a circuit diagram illustrating display circuitry of the LCD, in accordance with an embodiment.

Among the various components of an electronic display 18 may be a pixel array 100, as shown in FIG. 4. As illustrated, FIG. 4 generally represents a circuit diagram of certain components of the display 18 in accordance with an embodiment. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filter only one color (e.g., red, blue, or green) of light. For purposes of the present disclosure, the terms "pixel," "subpixel," and "unit pixel" may be used largely interchangeably.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In certain embodiments, the common electrodes may include two sets of common electrodes, which correspond to row and column pixels, respectively. In the depicted embodiment of FIG. 4, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and off) for a period of time based on the respective presence or absence of a scanning or activation signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 122 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a VCOM source 128 to provide a VCOM output to the common electrodes 112. In some embodiments, the VCOM source 128 may supply a different VCOM to different common electrodes 112 at different times. In other embodiments, the common electrodes 112 all may be maintained at the same potential (e.g., a ground potential) while the display 18 is on.

The display 18 may be configured to switch between two modes of operation: a display mode and a touch mode. In the display mode, the row and column VCOMs 130, 132 operate in the aforementioned manner, in which an electric field is generated between the column and row VCOMs 130, 132 and respective pixel electrodes 110. The electric field modulates the liquid crystal layer to let a certain amount of light pass through the pixel. Thus, an image may be displayed on the display 18 in the display mode. In the touch mode, the row VCOM 132 and the column VCOM 130 may be configured to sense a touch on the display 18. In certain embodiments, a stimulus signal or voltage may be provided by the row VCOM 132. The column VCOM 130 may be configured to receive a touch signal and output the data to be processed by the processor(s) 12. The touch signal may be generated when an operator touches the display 18 and capacitively couples with a portion of the row VCOM and a portion of the column VCOM. Thus, the portion of the column VCOM may receive a signal indicative of a touch.

Figure 5:
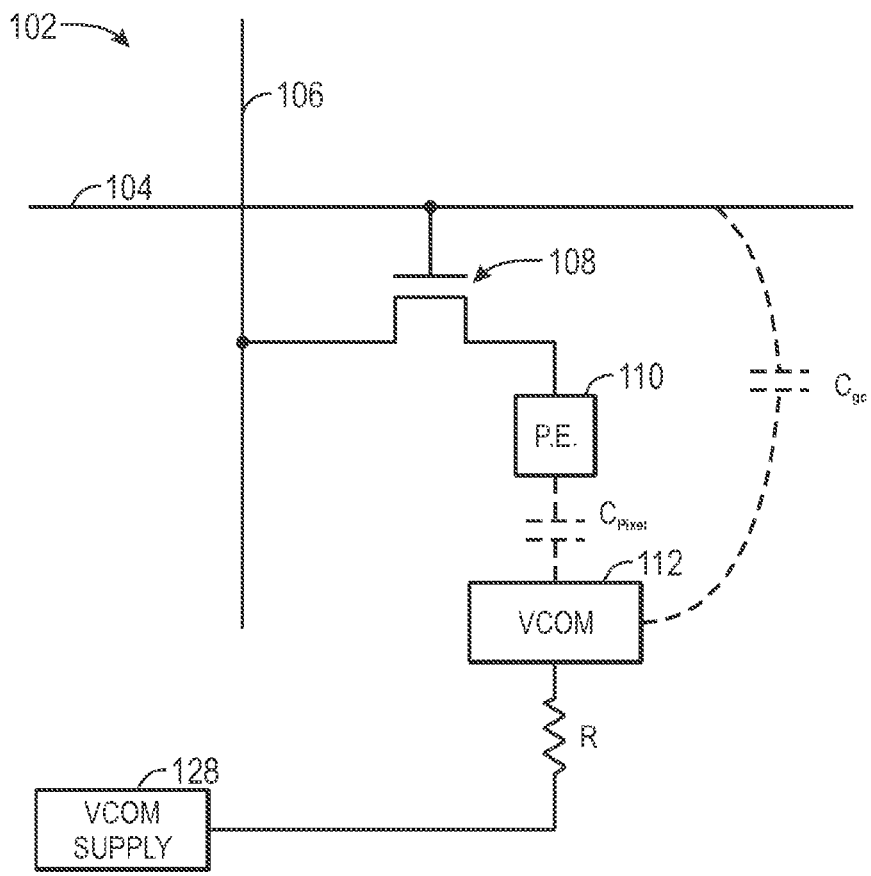
FIG. 5 is a circuit diagram of a pixel that illustrates a parasitic capacitance that may form between a VCOM and a gate line, in accordance with an embodiment.

Because the various elements of the display 18 may be disposed so closely to one another, parasitic capacitances may arise. Indeed, as shown by a schematic circuit diagram of a pixel 102 in FIG. 5, a parasitic capacitance Cgc may arise between the common electrode (VCOM) 112 of the pixel 102 and the corresponding gate line 104. A resistance R generally represents the resistance of the VCOM 112. The VCOM supply 128 may provide the common voltage to the VCOM 112. A capacitance Cpixel may form between the pixel electrode 110 and the VCOM 112.

The resistance R and the parasitic capacitance Cgc of the VCOM 112 may effectively form an RC circuit from the gate line 104 to the VCOM supply 128. When the gate line 104 voltage changes rapidly, this effective RC circuit may cause the VCOM 112 to become perturbed. The VCOM 112 may quickly change, then gradually return to the voltage supplied by the VCOM supply 128 according to a time constant $\tau$, which may be defined by the resistance R and the parasitic capacitance Cgc. As will be discussed below, by varying the resistance R of different VCOMs of the display 18, the time constants $\tau$ may be adjusted.

Rapid changes in the VCOM 112 voltage may impact the pixel electrode 110. As the VCOM 112 becomes perturbed, the data programmed into the pixel electrode 110 may vary slightly. Depending on how long the voltage perturbation on the VCOM 112 is occurring, which depends on the time constant $\tau$, a different voltage could ultimately be programmed on the pixel electrode 110. This is because the TFT 108 will not completely prevent current from passing through the TFT 108 until shortly after the activation signal from the gate line 104 is removed. In other words, the voltage that is ultimately programmed in the pixel 102 will be the voltage that remains some short period of time after the gate line 104 voltage has changed.

During this time between the removal of the activation signal on the gate line 104 and the opening of the TFT 108, however, the voltage perturbation on the VCOM 112 may be affecting the pixel electrode 110 voltage. The degree to which the voltage perturbation affects the ultimate voltage programmed in the pixel 102, then, may depend on the severity of the perturbation (the amount of effective charge transferred) and the time constant $\tau$. Since the display 18 includes at least two VCOMs 112 with different inherent characteristics (due to different shapes, sizes, and/or placements, etc.), the ultimate voltages stored in the pixels 102 associated with different VCOMs 112 could vary. By adjusting the resistance R on at least one of the VCOMs 112, the time constant $\tau$ of that VCOM 112 may be adjusted such that, when the same voltage is asserted on the pixels 102 of the different VCOMs 112, the same ultimate voltage will be stored on the respective pixel electrodes 110. Thus, image artifacts due to variations between pixels 102 associated with different VCOMs 112 may be avoided.

Figure 6:
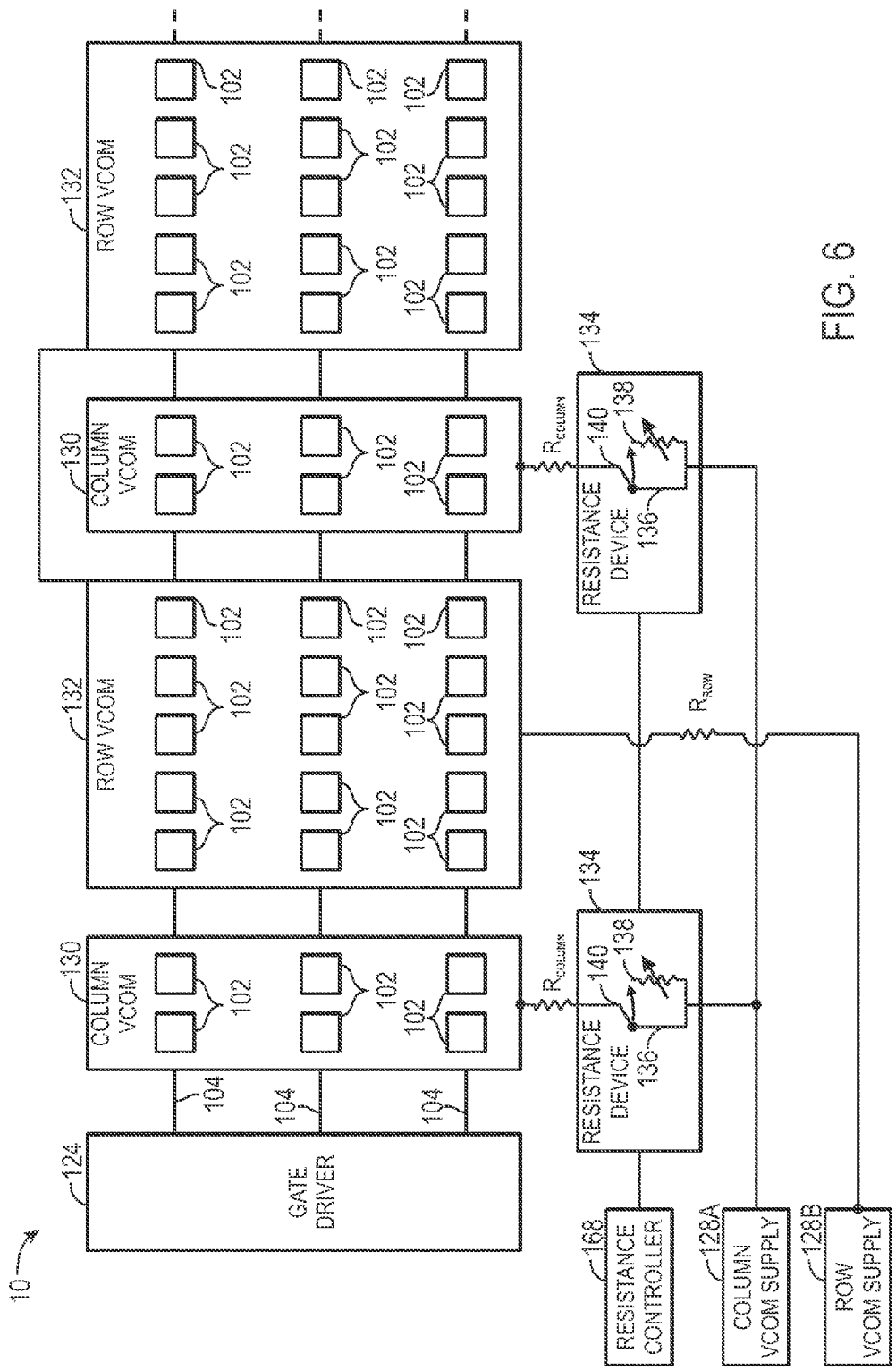
FIG. 6 is a block diagram illustrating circuitry for controlling a variation in voltage perturbation between sets of VCOMs of an LCD to improve image quality of the LCD, in accordance with an embodiment.

The display 18 may have any number of VCOMs and the VCOMs may vary in size. FIG. 6 generally represents a diagram of circuitry of the electronic device 10 capable of reducing variation in voltage perturbation between the column VCOMs 130 and the row VCOMs 132 of the display to improve image quality of the display 18. Specifically, in the present embodiment, the display 18 includes a column VCOM 130 and a row VCOM 132. Each of the column VCOM 130 and the row VCOM 132 may include a plurality of pixels 102, as shown. Further, the display 18 may include a plurality of row VCOMs 132 and a plurality of column VCOMs 130. The row VCOMs 132 may be coupled to each other via a line such that each row VCOM 132 shares the same voltage level. The column VCOMs 130 may be individually coupled to the VCOM source 128. Although not shown in FIG. 6, other VCOMs may also be present (e.g., "guard rail" VCOMs between the column VCOMs 130 and the row VCOMs 132).

At least partially due to the configuration of the row VCOMs 132—namely, that the row VCOMs 132 are in line with the gate lines 104—the row VCOMs 132 may experience greater interference from voltage changes in the gate line 104 due to TFT gate deactivation. Since each of the column VCOMs 130 may extend down the display 18, and thus only shares a relatively small part its total area with a given gate line 104, the column VCOMs 130 may experience comparatively less. Moreover, the column VCOMs 130 and the row VCOMs 132 may have different inherent resistances (e.g., Rcolumn and Rrow) between respective voltage supplies 128A and 128B, as well as different capacitances between the gate lines 104 (e.g., Cgc values associated with the VCOMs 130 and 132). The effect of these different VCOM characteristics, as well as different amounts of exposure to the gate lines 104, may produce different voltage perturbations on the column VCOMs 130 and the row VCOMs 132.

Since different voltage perturbations could produce image artifacts, differences in voltage perturbations may be mitigated by adjusting the resistance(s). As will be discussed below, increasing the column VCOM 130 resistance may cause the corresponding time constant of the voltage perturbation on the column VCOM 130 to be extended. Ordinarily, increasing a resistance is considered problematic. Indeed, an increased resistance can result in lower power efficiency and increased heat waste. In this case, however, increasing the resistance may reduce or eliminate image artifacts.

As such, column VCOMs 130 may be coupled to a resistance device 134. In the example of FIG. 6, the resistance device 134 includes a non-resistive path 136 and a resistive path 138 selectable by a switch 140. A resistance controller 168 may cause the resistance device 134 to switch between the resistive path 138 and the non-resistive path 136. The resistance controller 168 may be a separate component of the display 18 or may be integrated into other components of the display 18 (e.g., display or touch driver circuitry). In some embodiments, the resistance controller 168 may switch to the resistive path 138 during a display mode and to the non-resistive path 136 during a touch screen mode of the display 18. In other embodiments, only a resistive path 138 may be employed. In these embodiments, the resistance controller 168 may be absent.

In any case, the resistive path 138 may add resistance using any suitable resistive elements. For example, these may include a resistor of a single value, a resistor that may be set or programmed during the fabrication of the display 18, a potentiometer, or a variable resistance device (e.g., a resistor ladder). Additionally or alternatively, the resistance device 134 may include a capacitor. Such a capacitor may vary the time constant of the column VCOMs 130 in a similar manner as the additional resistance. Moreover, the column VCOMs 130 may be coupled to different resistance devices 134 with different resistance values. In certain embodiments, some column VCOMs 130 may be coupled to resistance devices 134 and some column VCOMs 130 may not be coupled to resistance devices 134.

Moreover, in some embodiments, the resistance controller 168 may do more than just control the switching of the resistance device 134 between the resistive path 138 and the non-resistive path 136. Indeed, the resistance controller 168 may, additionally or alternatively, control the resistance of the resistive path 138. For example, the resistive device(s) of the resistive path 138 may be chosen to provide a range of possible resistance values. The resistance controller 168 may tune the resistance of the resistive path 138 to reduce or eliminate image artifacts caused by variations in voltage perturbation.

Figure 7:
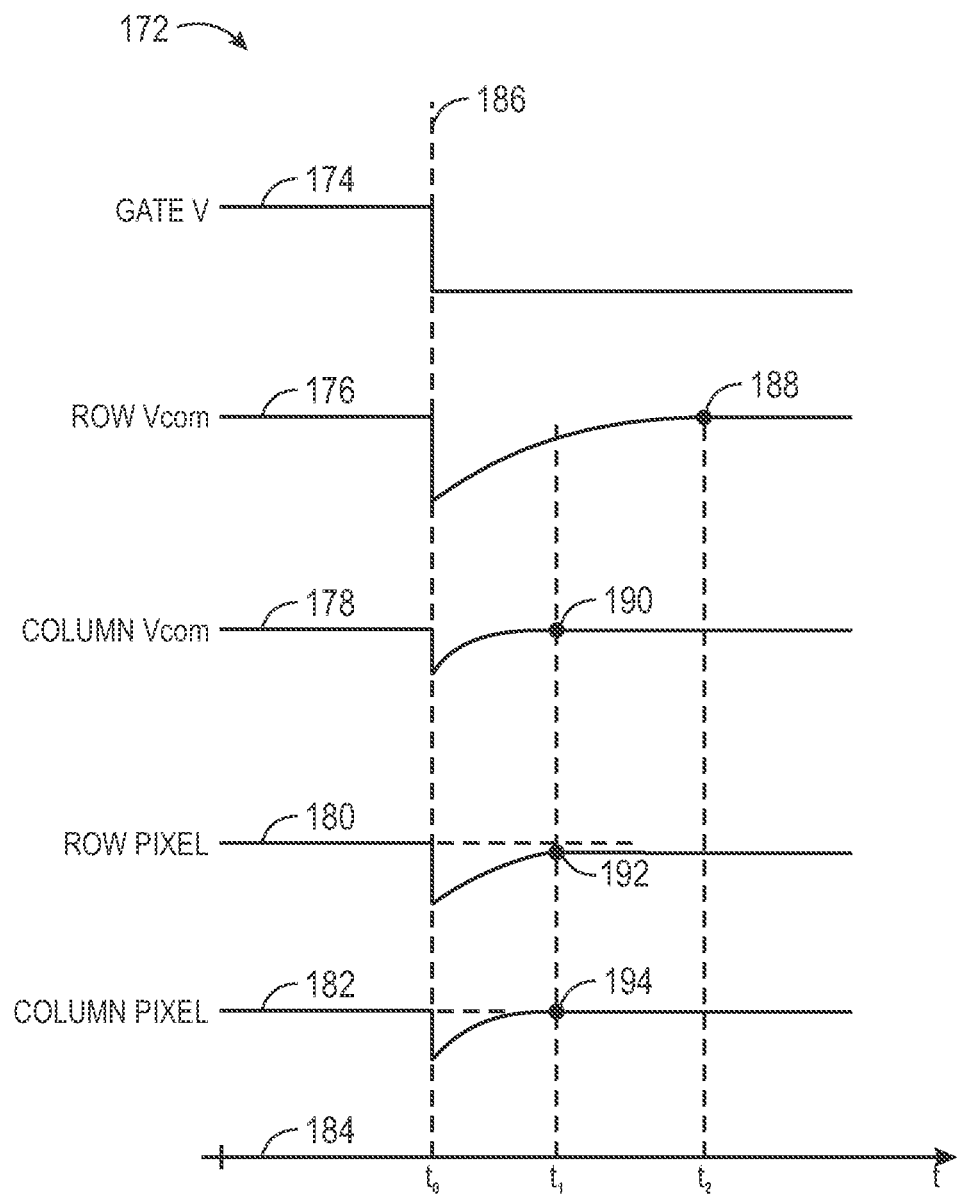
FIG. 7 is a timing diagram illustrating voltage changes in certain display elements caused by TFT gate deactivation when the disclosed techniques are not employed.
Figure 8:
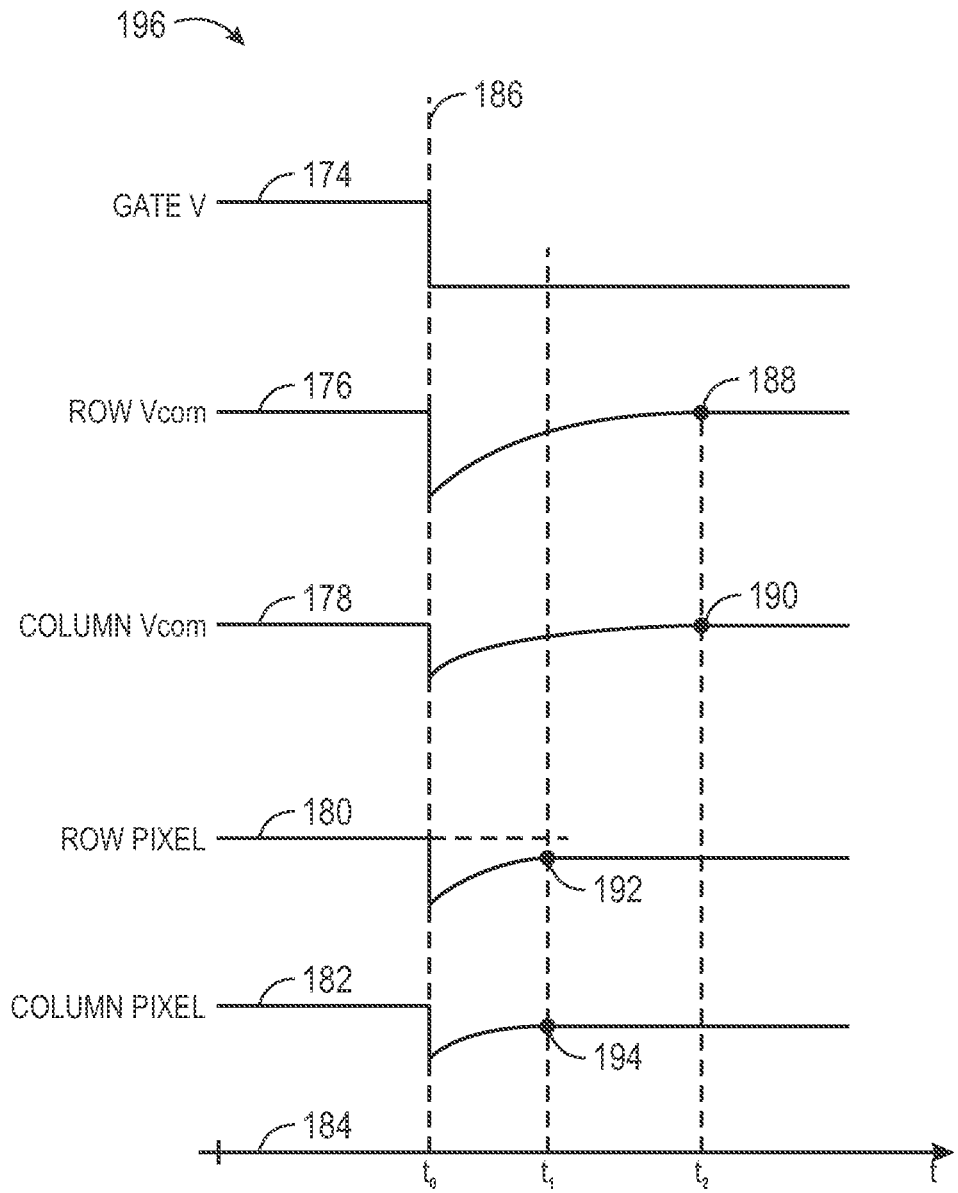
FIG. 8 is a timing diagram illustrating voltage changes in certain display elements caused by TFT deactivation after applying the disclosed techniques, thereby improving image quality, in accordance with an embodiment.

FIGS. 7 and 8 illustrate the effect of reducing the voltage perturbation differences between the column VCOMs 130 and the row VCOMs 132. Namely, FIG. 7 represents a timing diagram when the present techniques are not applied, and FIG. 8 represents a timing diagram when the present techniques are applied.

FIG. 7 illustrates voltage levels 172 of the row VCOM 132 and the column VCOM 132 in response to TFT gate deactivation with respect to time when an additional resistance on the column VCOM 130 is not employed. TFT gate deactivation is illustrated by a gate voltage curve 174, in which the voltage in the TFT gate line 104 drops at $t_0$, signifying the point of TFT gate deactivation 186. Accordingly, due to capacitive coupling between the gate line 104 and the VCOMs 130 and 132, a voltage of the row VCOM (line 176) may also exhibits a transient drop in voltage at $t_0$ as well. The row VCOM 132, due to its configuration and physical relation to the gate line, may experience a rise time of $t_2-t_0$ in order to return to its original voltage value at $t_2$ (point 188). A voltage in the column VCOM (line 178) may experience a less dramatic voltage drop at $t_0$, in response to TFT gate deactivation 186. As such, the column VCOM 130 may return to its original voltage (point 190) faster than the row VCOM 132, at $t_1$.

A voltage in the row pixel (line 180), which is coupled to the row VCOM 132, may experience a similar drop in voltage level. As such, the row pixel voltage 180, which generally determines how much light is shown by the pixel, would not return to its original value until $t_2$. In the example of FIG. 7, however, the TFT 108 may completely open and prevent any changes in any pixels 102 after time $t_1$. Thus, the row pixel voltage 180 does not ever fully return to its programmed value, but instead stops at the voltage level it has reached by time $t_1$ (point 192). Meanwhile, a voltage in the column pixel (line 182) may experience a voltage drop and rise time similar to that of the column VCOM (line 190). The column pixel thus may return to its original value (point 194) at $t_1$. That is, the column pixel (line 182) may return to its original value faster than the row pixel (line 180). As a result, the variation in voltage perturbation between row VCOM (line 176) and column VCOM (line 178) may result in different programmed values in row pixels (point 192) and column pixels (point 194) even when the values should be the same. This may be seen on the display 18 as vertical striping artifacts when the column VCOMs 130 extend vertically down the display 18.

The rise time of the column pixel (line 182) may be altered by altering the resistance of the column VCOM 130. Specifically, the rise time of the column VCOM 130, and thus column pixel, may be increased by increasing the resistance of the column VCOM 130. As such, the resistance device 134 described above and illustrated in FIG. 6 may be chosen or tuned to a resistance that increases the rise time of the column VCOM to match that of the row VCOM. Thus, the variation in voltage perturbation between the column pixel and the row pixel caused by TFT deactivation may be largely reduced and/or eliminated.

FIG. 8 illustrates the voltage levels 196 of the row VCOM (line 176) and the column VCOM (line 178), in which the column VCOM 130 is coupled to the resistance device 134 shown in FIG. 7. As illustrated, the gate voltage (line 174) drops at the point of TFT gate deactivation 186. Likewise, the row VCOM voltage (line 176) and column VCOM voltage (line 178) drop as well, due to the capacitive coupling between the VCOMs 130 and 132 and the gate line 104. The row VCOM 132 experiences a rise time of $t_2$ in order to return to its original voltage (point 188). The column VCOM 130, due to it its added resistance from the resistance device 134, may also experience a rise time of $t_g$ in order to return to its original voltage level (point 190). Accordingly, the row pixel voltage (line 180) and column pixel voltage (line 184) experience correspondingly similar rise times in response to TFT gate deactivation. In some embodiments, the voltage drops may also be similar, but may not be in all cases. As such, both the row pixel voltage (line 182) and the column pixel voltage (line 184) may be stopped at the same voltage level when the TFT 108 completely opens and the row pixels (line 180) and column pixels (line 182) stabilize. Thus, display errors and artifacts attributed to variation in voltage perturbation between row VCOMs 132 and column VCOMs 130 may be largely reduced and/or eliminated.

Figure 9:
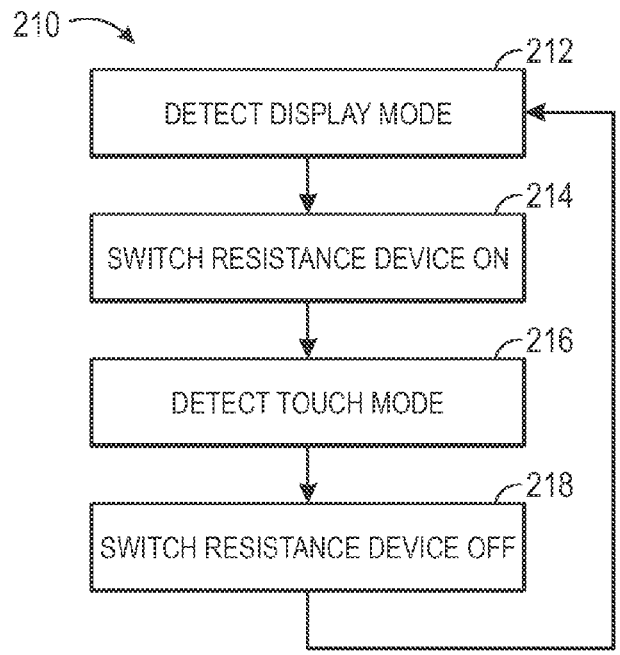
FIG. 9 is a flowchart illustrating a process of operating the electronic device to reduce or avoid image artifacts, in accordance with an embodiment.

As mentioned, the resistance device 134 may be switched on when the display is in display mode. FIG. 9 illustrates a process 20 of operation of the display 18. In certain embodiments, the process may be carried out by the resistance controller 168 coupled to the resistance device 134, as shown in FIG. 7. In certain embodiments, the resistance controller 168 may detect (block 212) that the display 18 is in the display mode. The resistance controller 168 may detect that the display 18 is in the display mode by sensing a signal indicative of the display 18 being in the display mode. The resistance controller 168 may connect the resistive path 138 (block 214) in response to detecting the display mode. Thus, the column VCOM 130 may be coupled to the resistance path 138 and take on a higher resistance value. As discussed, this may allow the column VCOM 130 rise time to generally match that of the row VCOM 132. In other embodiments, this may allow the column VCOM 130 rise time to be lengthened such that the ultimate voltage programmed in the column pixels 102 is the same as that of the row pixels 102 when the same source or data voltage is provided.

Since the resistance device 134 may not be needed when the display 18 is in touch mode, the resistance controller 168 may be configured to detect (block 216) when the display 18 is in the touch mode. As such, the resistance controller 166 may connect to the non-resistive path 136 (block 218) in response to detecting (block 216) the touch mode, decoupling the column VCOM 130 from the resistive path 138. The resistance controller 168 may continue to detect when the display 18 is in the display mode or touch mode, and switch the resistance device 134 accordingly.

Figure 10:
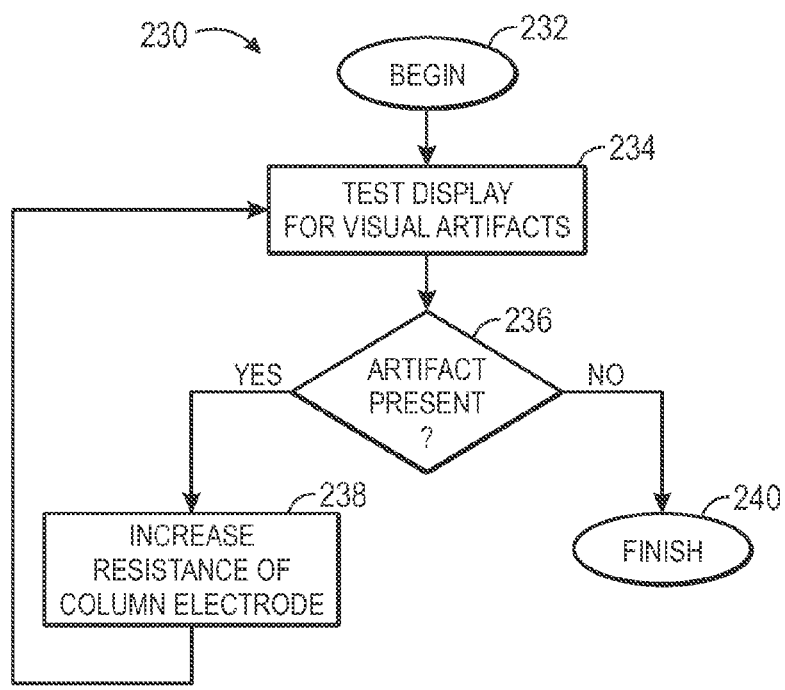
FIG. 10 is a flowchart illustrating a process of calibrating a resistance value of the electronic device to reduce or avoid image artifacts, in accordance with an embodiment.

Additionally or alternatively to coupling and decoupling the added resistance and the column VCOM 130, the resistive element of the resistance device 134 may be selected or tuned to provide a resistance value that allows the column VCOM 130 to experience a voltage perturbation similar to that of the row VCOM 132. A process 230 of choosing or tuning the resistance of the resistance device 134 is illustrated in FIG. 10. The process begins (block 232) by testing (block 234) the display 18 for visual artifacts. This may be accomplished by configuring the display 18 to display a certain image or series of images and inspecting the display 18 for display errors such as flickers, uneven color, or other artifacts. The inspection may be performed by a human operator or by a machine, such as a computer connected to a camera or video camera. In certain embodiments, inspection data (e.g., images) taken by a camera may be subject to image processing, in which visual artifacts may be detected electronically.

From the results obtained by the test (block 234), it may be determined whether or not an artifact is present (question block 236). If an artifact is determined to be present, then the resistance level of the resistance device 134 may be increased. In embodiments that use a single-value resistor, this may include changing the resistor value. In embodiments that use a variable resistor, this may include adjusting the resistance value of the variable resistor. The display 18 may then be tested (block 234) again for visual artifacts, and another determination may be made regarding whether an artifact is present or not (question block 236). If an artifact is detected, the resistance level of the resistance device 134 may continue to be increased (block 238). The display 18 may continue to be tested (block 234) for visual artifacts, and the resistance of the resistance device may continue to the increased (block 238), until an artifact is no longer present (detectable). Thus, when no visual artifact due to differential VCOM 130 and 132 voltage perturbation is present, the process may end (block 240).

The resulting resistance level set by the process 230 may be held constant as the resistance device 134 is switched. Thus, the variable resistance may generally be set or tuned to a certain resistance value such that visual artifacts that may be caused by a variation in voltage perturbation between row and column VCOMs 132 and 130 are no longer present. In certain embodiments, the display 18 may be continuously tested and/or monitored for visual artifacts as the resistance of the resistance device 134 is tuned until artifacts are no longer present Tuning or adjusting the value of the variable resistor may be done by a human operator, who may visually inspect the display and/or manually adjust the value of the variable resistor until artifacts cannot be seen. In certain embodiments, the entire process 230 may be performed by a machine, which may also be configured to monitor the display for artifacts through image processing while electronically controlling the value of the resistance device 134 until artifacts are no longer detected. In certain embodiments, this process may be performed in a factory setting to calibrate the resistance device 134 of the electronic device (e.g., the electronic display 18 or the electronic device 10) during manufacturing. In certain embodiments, this process may be performed on one electronic device in a batch of similar electronic devices, in which the determined resistance value may be applied to all electronic devices in the bath. Additionally or alternatively, this process may be performed during use of the electronic device, including testing the display for artifacts at predetermined times or during troubleshooting to update or reset the resistance value of the variable resistor accordingly.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display comprising:
    a first pixel comprising a first common voltage layer (VCOM layer), wherein the first VCOM layer is configured to experience a first voltage perturbation in response to a pixel deactivation signal;
    a second pixel comprising a second VCOM layer, wherein the second VCOM layer is configured to experience a second voltage perturbation in response to the pixel deactivation signal; and
    a resistive device configured to be coupled to the first VCOM layer during at least a display phase of the electronic display, wherein the resistive device is configured to add resistance to the first VCOM layer so as to cause the first voltage perturbation to substantially match the second voltage perturbation, thereby reducing or eliminating image artifacts due to differences in VCOM layer voltage perturbation.

2. The electronic display of claim 1, wherein the resistive device comprises a resistor of constant value to add the resistance to the first VCOM layer.

3. The electronic display of claim 1, wherein the resistive device comprises a variable resistance configured to be tuned to the resistance added to the first VCOM layer.

4. The electronic display of claim 1, wherein the first VCOM layer is generally formed in a column perpendicular to a gate line configured to supply the pixel deactivation signal.

5. The electronic display of claim 1, wherein the second VCOM layer is electrically coupled to, but not physically contiguous with, at least one other VCOM layer, wherein the at least one other VCOM layer and the second VCOM layer are generally formed in a row parallel to a gate line configured to supply the pixel deactivation signal.

6. The electronic display of claim 1, wherein the first VCOM layer and the second VCOM layer are configured to have different parasitic capacitances with a gate line configured to supply the pixel deactivation signal.

7. An electronic device comprising:
a processor configured to generate an image signal, wherein the image signal comprises first and second data signals configured to cause two pixels to emit about the same amount of light; and
an electronic display configured to display the image signal, wherein the electronic display comprises:
a first pixel comprising a first common voltage layer (VCOM layer) that receives voltage from a first VCOM layer voltage supply through a discrete resistive element, capacitive element, or both, wherein the first pixel is configured to emit a first amount of light when programmed with the first data signal; and
a second pixel comprising a second VCOM layer receiving voltage from a second VCOM layer voltage supply, wherein the second pixel is configured to emit a second amount of light when programmed with the second data signal;
wherein the resistive element, the capacitive element, or both are configured to add to the resistance, capacitance, or both, of the first VCOM layer to cause a first transient voltage dissipation time associated with the first VCOM layer to substantially match a second transient voltage dissipation time associated with a second VCOM layer, such that the first amount of light and the second amount of light are about the same.

8. The electronic device of claim 7, wherein the resistive element, the capacitive element, or both, are configured to be applied while the electronic display is operating in a first state but not a second state.

9. The electronic device of claim 8, wherein the first state is a display phase of operation, during which the electronic display is configured to program the image signal onto the pixels of the display, and the second state is a touch phase of operation, during which the electronic display is configured to sense touches.

10. The electronic device of claim 7, wherein the first transient voltage dissipation time associated with the first VCOM layer and the second transient voltage dissipation time associated with the second VCOM layer are configured to occur when the first and second pixels are supplied a deactivation signal.

11. An electronic display comprising:
a plurality of pixels configured to emit light when provided with, some of the pixels being associated with a first common voltage layer (VCOM layer) and some of pixels being associated with a second VCOM layer; and
a resistive element, a capacitive element, or both, coupled to the first VCOM layer and configured to add to the resistance, the capacitance, or both of the first VCOM layer to increase a rise time of a transient voltage response of the first VCOM layer, wherein the resistive element, the capacitive element, or both are configured to cause the plurality of pixels to emit substantially the same amount of light when provided the same data signals.

12. The electronic display of claim 11, wherein the first VCOM layer and the second VCOM layer are configured to experience transient voltage responses, wherein the resistive element, the capacitive element, or both are configured to cause a voltage difference programmed in the plurality of pixels to be approximately the same as of a time when the pixels are deactivated when provided the same data signals.

13. A method comprising:
coupling a resistive element to a first common voltage layer (VCOM layer) associated with a first set of pixels in an electronic display when the electronic display is in a first state; and
decoupling the resistive element from the first VCOM layer when the electronic display is in a second state.

14. The method of claim 13, wherein the resistive element is coupled and decoupled to the first VCOM layer using a resistance controller configured to switch between a resistive path comprising the resistive element and a non-resistive path lacking the resistive element.

15. The method of claim 13, wherein the first state comprises a display mode of operation and the second state comprises a touch mode of operation.

16. The method of claim 13, wherein the first VCOM layer is coupled to the resistive element such that a first transient voltage response time of the first VCOM layer substantially matches a second transient voltage response time of a second VCOM layer not coupled to the resistive element.

17. A method, comprising:
monitoring an electronic display for visual artifacts in response to TFT deactivation;
determining if a visual artifact is present in the electronic display; and
adjusting a resistance value of a resistance device associated with a common voltage layer (VCOM layer) of the electronic display when a visual artifact is present to reduce or eliminate the visual artifact.

18. The method of claim 17, comprising increasing the resistance value of the resistive element when a visual artifact is present.

19. The method of claim 17, wherein monitoring the electronic display for visual artifacts comprises:
supplying an activation signal to a row of pixels;
supplying a display signal to the row of pixels;
removing the activation signal from the row of pixels;
detecting a display output from the row of pixels; and
analyzing the display output for visual artifacts.

20. The method of claim 19, wherein detecting the display output and analyzing the display output are performed by a human operator.

21. The method of claim 19, wherein detecting the display output and analyzing the display output are performed by a machine.

22. A method of manufacturing an electronic display comprising:
- providing a first common voltage layer (VCOM layer) associated with a row of pixels, wherein the first VCOM layer is configured to experience a first transient voltage when the row of pixels is activated, thereby causing a programmed voltage value of a first group of the pixels to vary by a first voltage difference;
- providing a second VCOM layer associated with the row of pixels but not electrically connected to the first VCOM layer, wherein the second VCOM layer is configured to experience a second transient voltage when the row of pixels is activated, thereby causing a programmed voltage value of a second group of the pixels to vary by a second voltage difference; and
- providing a resistive element, a capacitive element, or both coupled to the first VCOM, wherein the resistive element, the capacitive element, or both are configured to cause the first VCOM to dissipate the first transient voltage such that the first voltage difference and the second voltage difference are substantially the same when programmed with the same voltages.

23. The method of claim 22, wherein the first VCOM layer provided is generally formed in a column perpendicular to the row of pixels.

24. The method of claim 22, wherein the second VCOM layer provided is generally formed in a row parallel to the row of pixels.

25. The method of claim 24, wherein the second VCOM layer provided is generally formed from a plurality of non-contiguous, but electrically connected, segments extending parallel with the row of pixels.

26. An electronic device comprising:
- a processor configured to generate image signals; and
- an electronic display configured to display the image signals, the electronic display comprising:
  - a first pixel associated with a first common voltage layer (VCOM layer);
  - a second pixel associated with a second VCOM layer; and
  - a resistive device configured to couple to the first VCOM layer to cause a first transient voltage on the first VCOM layer to dissipate at approximately the same rate as a second transient voltage on the second VCOM layer, thereby reducing or eliminating image artifacts caused by differences in VCOM layer transient voltages.

* * * * *